United States Patent
Zilai et al.

(10) Patent No.: US 9,891,131 B1
(45) Date of Patent: Feb. 13, 2018

(54) BLOWOUT PREVENTER TEST SYSTEM

(71) Applicant: WORX AMERICA, INC., Tomball, TX (US)

(72) Inventors: Michael Shawn Zilai, Tomball, TX (US); Charles Horace Camp, Spring, TX (US)

(73) Assignee: BAY WORX LABORATORIES, LLC, Tomball, TX (US)

( * ) Notice: Subject to any disclaimer, the term of this patent is extended or adjusted under 35 U.S.C. 154(b) by 134 days.

(21) Appl. No.: 15/044,788

(22) Filed: Feb. 16, 2016

Related U.S. Application Data

(60) Provisional application No. 62/117,980, filed on Feb. 19, 2015.

(51) Int. Cl.
*G01M 3/02* (2006.01)
*E21B 33/06* (2006.01)

(52) U.S. Cl.
CPC .............. *G01M 3/02* (2013.01); *E21B 33/06* (2013.01)

(58) Field of Classification Search
CPC ...... E21B 33/06; E21B 33/061; E21B 33/062; E21B 33/063; E21B 33/064
See application file for complete search history.

(56) References Cited

U.S. PATENT DOCUMENTS

| | | | | |
|---|---|---|---|---|
| 8,347,982 B2* | 1/2013 | Hannegan | ............... | E21B 19/09 166/347 |
| 8,579,033 B1* | 11/2013 | Robichaux | .............. | E21B 33/06 166/339 |
| 2004/0094296 A1* | 5/2004 | Richards | ................. | E21B 17/18 166/250.08 |
| 2004/0216886 A1* | 11/2004 | Rogers, Jr. | ............ | E21B 43/121 166/372 |

* cited by examiner

*Primary Examiner* — Peter Macchiarolo
*Assistant Examiner* — Anthony W Megna Fuentes
(74) *Attorney, Agent, or Firm* — Jackson Walker, LLP

(57) ABSTRACT

The present disclosure provides a cooling system and method for a reciprocating mandrel in a blowout preventer test system that provides coolant to the mandrel through a majority of its stroke. The system includes an inner coolant tube and an outer coolant tube, with both tubes inserted into a mandrel inner bore. The inner coolant tube is fixed in position on a base and not attached to the mandrel. The outer coolant tube is fixed in position and attached to the mandrel. The outer coolant tube slidably and optionally sealingly engages the inner coolant tube throughout the mandrel stroke. Coolant can flow through the base, upward through an inner volume of the inner coolant tube, and into an inner volume of the outer coolant tube and out of coolant openings in the outer coolant tube to flow on the inner bore surfaces of the mandrel to cool the mandrel.

9 Claims, 7 Drawing Sheets

BLOWOUT PREVENTER TEST SYSTEM

CROSS REFERENCE TO RELATED APPLICATIONS

This application claims the benefit of U.S. Provisional Application No. 62/117,980, filed Feb. 19, 2015.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure generally relates to the oil field equipment. Specifically, the disclosure relates to the test equipment for blowout preventers.

Description of the Related Art

With the tragic incident of an offshore explosion caused when a safety blowout preventer ("BOP") failed to close a subsea oil well after a gas leak, more engineering designing and testing of blowout preventers are being done by those in the oil field industry. A fatigue test simulates well tubing being inserted through the BOP to determine whether the BOP can hold pressure over its expected life. A known BOP test system is shown in FIG. 1. The BOP test system 102 includes a reservoir 104 of hydraulic fluid with supply lines 116 connected to pumps 106. The pumps 106 supply pressurized hydraulic fluid to a high pressure filter 120 through supply lines 118 and then to a hydraulic control valve 108. The control valve 108 controls hydraulic fluid flow into and out of a hydraulic cylinder 110. A heat exchanger 122 cools the hydraulic fluid in the reservoir. The hydraulic cylinder 110 repetitiously raises and lowers a hollow mandrel through internal BOP seals (not shown) to test the BOP design and integrity. The large number of quick repetitions conducted for the test causes friction that causes heat on the seals, which is not experienced in the field. To better simulate field conditions, the seals are cooled by a fluid. A cooling system with a coolant reservoir, pump, and heat exchanger is attached to a lower portion of the BOP test system. Coolant enters through a flanged base that is attached to a chamber below the BOP and flows upward through a cooling tube that is smaller in diameter than the mandrel inside diameter. As the mandrel raises and lowers through the BOP seals, the fixed position inner tube sprays or otherwise flows the coolant on the inside of the mandrel. However, the inner tube only flows the coolant to the particular surface of the mandrel that is adjacent the inner tube at a particular time during that portion of the mandrel stroke as the mandrel is raised and lowered. The inner tube is not able to flow fresh coolant to any mandrel inside surface that is above the inner tube for other portions of the stroke. Proportionately, at least one-half of the mandrel is therefore not cooled with flowing coolant during a given full stroke of the mandrel.

There remains then a need to provide a better cooling system for the mandrel during a greater portion the mandrel stroke.

BRIEF SUMMARY OF THE INVENTION

The present disclosure provides a cooling system for a reciprocating mandrel in a blowout preventer test system that provides coolant to the mandrel through a majority of its stroke. The system includes an inner coolant tube and an outer coolant tube, with both tubes inserted into an inner bore of the mandrel. The inner coolant tube is fixed in position on a base and not attached to the mandrel. The outer coolant tube is fixed in position and attached to the mandrel. The outer coolant tube is not fixedly attached to the inner coolant tube, but slidably and optionally sealingly engages the inner coolant tube throughout the mandrel stroke. Coolant can flow through the base, upward through an inner volume of the inner coolant tube, and into an inner volume of the outer coolant tube and out of coolant openings in the outer coolant tube to flow on the inner bore surfaces of the mandrel to cool the mandrel. Because the outer coolant tube can remain coupled to the mandrel in an upper portion of the mandrel inner bore during the stroke and continue to receive coolant from the fixed inner coolant tube, the coolant can flow to the inner bore surfaces substantially throughout the entire stroke.

The disclosure provides a blowout preventer ("BOP") test system, comprising: an actuator fluid source; an actuator fluid pump fluidically coupled to the actuator fluid source; an actuator valve fluidically coupled to the actuator fluid pump; an actuator fluidicly coupled to the actuator valve; a test stand having first chamber and coupled to the actuator; an inner coolant tube coupled to the test stand and disposed at least partially in the first chamber; an outer coolant tube slidably coupled with the inner coolant tube and having coolant openings in a portion of a top half of the outer coolant tube; a mandrel coupled to the actuator and configured to at least partially pass through the BOP, the mandrel having an inner cavity configured to allow the outer coolant tube to be disposed therein with the outer coolant tube coupled to the mandrel and the coolant openings of the outer coolant tube being configured to deliver coolant to a portion of a top half of the inner cavity of the mandrel independent of a position of the mandrel relative to the inner coolant tube during a stroke of the mandrel; a BOP coolant outlet fluidicly coupled with the first chamber; a pressure control valve fluidicly coupled to the BOP coolant outlet; a coolant source fluidicly coupled to the pressure control valve; a coolant pump fluidicly coupled to the coolant source; a heat exchanger fluidicly coupled to the coolant pump; and a BOP coolant inlet fluidicly coupled to the heat exchanger and to the inner coolant tube.

The disclosure provides a method of testing a BOP with the BOP test system comprising: flowing actuator fluid from the actuator fluid source to the actuator fluid pump; pumping the actuator fluid to the actuator valve; controlling the actuator fluid flow through the actuator valve to the actuator; reciprocally moving the mandrel by the actuator through a BOP mounted on the test stand; generating heat from the reciprocal movement of the mandrel through the BOP; flowing coolant from the coolant source to the coolant pump, through the heat exchanger, through the BOP coolant inlet, through the inner coolant tube, through the outer coolant tube, and out of the coolant openings in the outer coolant tube to inner surfaces of the top half of the mandrel inner cavity independent of a position of the mandrel relative to the inner coolant tube during a stroke of the mandrel.

DETAILED DESCRIPTION

Figure 1:
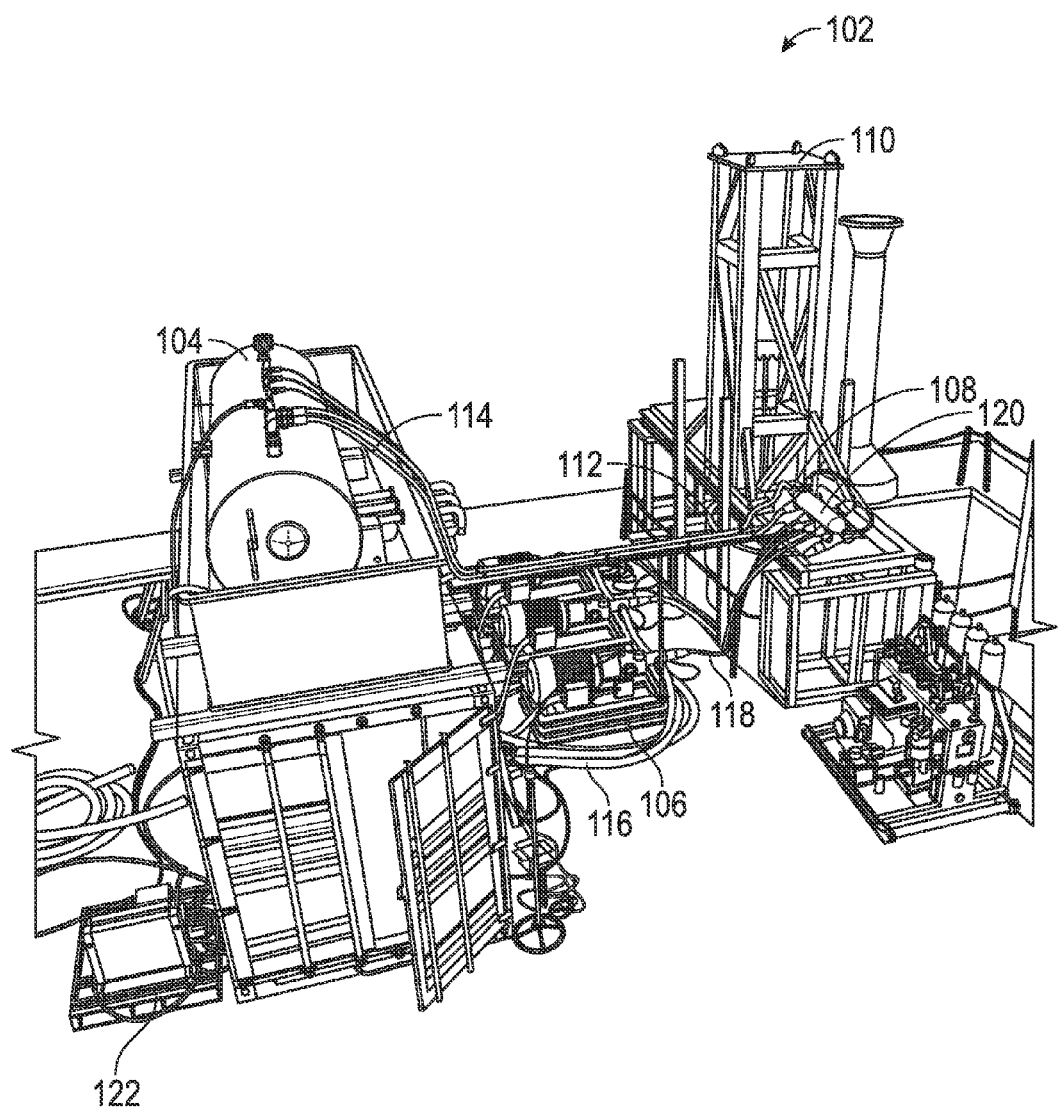
FIG. 1 is a schematic of a known BOP test system.

The Figures described above and the written description of specific structures and functions below are not presented to limit the scope of what Applicant has invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims. Where appropriate, one or more elements may have been labeled with an "A" or "B" to designate various members of a given class of an element. When referring generally to such elements, the number without the letter can be used. Further, such designations do not limit the number of members that can be used for that function.

The present disclosure provides a cooling system for a reciprocating mandrel in a blowout preventer test system that provides coolant to the mandrel through a majority of its stroke. The system includes an inner coolant tube and an outer coolant tube, with both tubes inserted into an inner bore of the mandrel. The inner coolant tube is fixed in position on a base and not attached to the mandrel. The outer coolant tube is fixed in position and attached to the mandrel. The outer coolant tube is not fixedly attached to the inner coolant tube, but slidably and optionally sealingly engages the inner coolant tube throughout the mandrel stroke. Coolant can flow through the base, upward through an inner volume of the inner coolant tube, and into an inner volume of the outer coolant tube and out of coolant openings in the outer coolant tube to flow on the inner bore surfaces of the mandrel to cool the mandrel. Because the outer coolant tube can remain coupled to the mandrel in an upper portion of the mandrel inner bore, the coolant can flow to the inner bore surfaces substantially throughout the entire stroke.

Figure 2A:
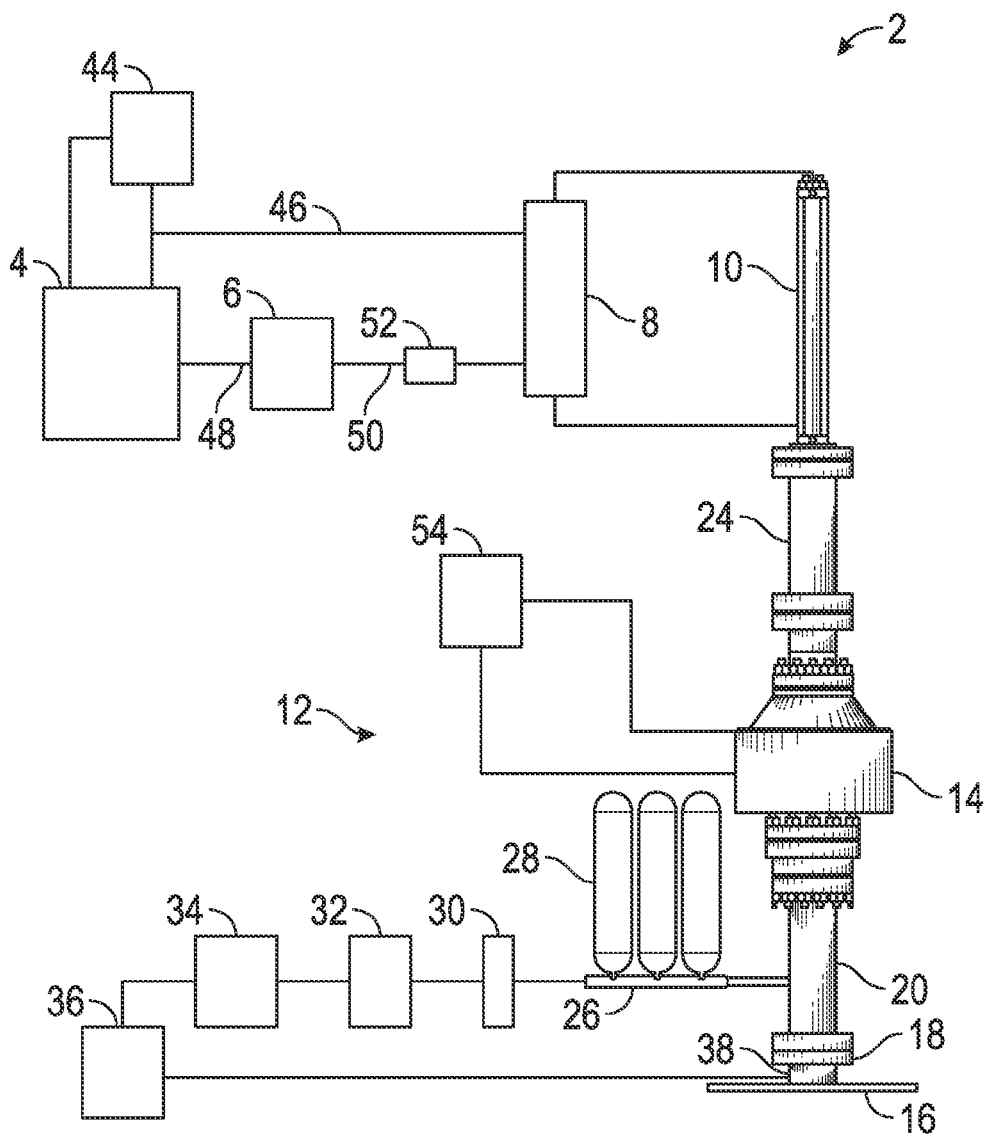
FIG. 2A is a schematic diagram of an improved BOP test system.
Figure 2B:
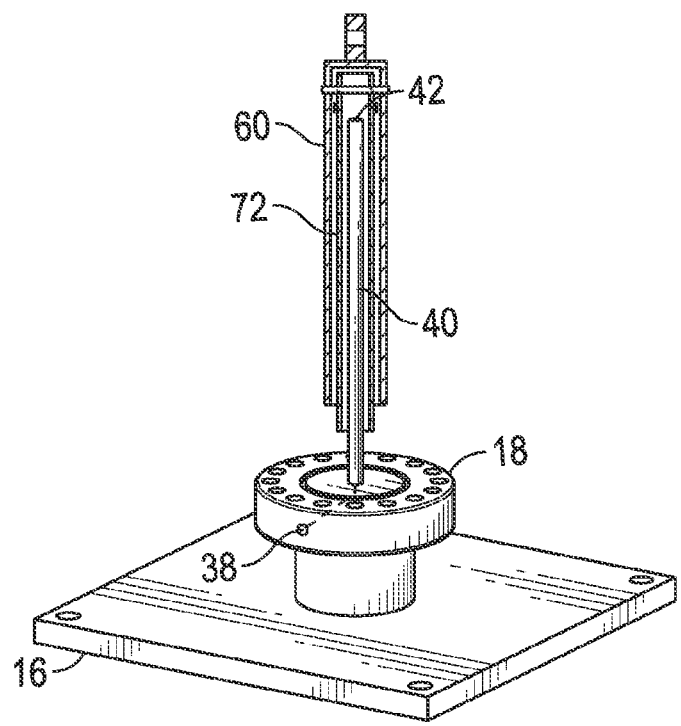
FIG. 2B is a schematic diagram of an internal portion of the BOP test system of FIG. 2A with improved cooling.

FIG. 2A is a schematic diagram of an improved BOP test system. FIG. 2B is a schematic diagram of an internal portion of the BOP test system of FIG. 2A with improved cooling. The figures will be described in conjunction with each other. The exemplary BOP test system 2 generally includes an actuator fluid source 4, such as a reservoir or other container. An actuator fluid pump 6 is fluidicly coupled to the actuator fluid source through a supply line 48 to the pump. A filter 52, such as a high pressure filter, is fluidicly coupled to the pump 6, such as through a supply line 50 to the filter. An actuator valve 8 is fluidicly coupled to the filter 52 through further supply lines. For purposes herein, the term "line" is broadly used to include tubing, hosing, ports, and other fluid channels for transferring fluids from one component to another. An actuator 10, such as a hydraulic or pneumatic cylinder, is fluidicly coupled to the actuator valve 8. Further, the actuator can be other components that can move linearly, including rack and pinion, linear actuators, and other devices. (If a corollary system is based on electrical components, then the analogous components would be considered as being encompassed within the components described herein. For example, a pump would include a generator, fluid would include electrical flow of electrons as energy, fluid lines would include electrical lines, a valve would include a switch, and so forth.) A return line is coupled between the actuator 10 and the valve 8. Thus, fluids can be directed through the valve 8 through one line to the actuator 10, moving the actuator in one direction, and flow back to the valve through the other line. For a reverse direction, the fluid can be supplied from the valve and returned to the valve in the opposite lines to move the actuator in the reverse direction. The valve 8 can return fluid back to the actuator fluid source 4 through a return line 46. A heat exchanger 44 can be coupled in a flow circuit to receive flow through the return line 46 or fluid in the actuator fluid source 4, cool the fluid, and then return the fluid back to the actuator fluid source 4.

A BOP test stand 16 can form the structure on which a BOP 14 can be installed thereon. The BOP test stand 16 can include a stub 18 that forms a mounting connection surface for sealingly coupling with a first chamber 20. The first chamber 20 can include components, such as coolant tubes 40 and 72 described herein, with a port 38 to supply fluid to the coolant tubes. The BOP 14 to be tested can be mounted on the first chamber 20, for example, using standard flanged connections. In at least one exemplary embodiment, a second chamber 24 can be mounted above the BOP 14 and can be used to mount the actuator 10 described above. A BOP control system 54 can be coupled to the BOP 14 for controlling the actuation of the BOP in a customary manner known to those with ordinary skill in the art. The BOP 14 and the BOP control system 54 can form a BOP assembly 12.

The actuator 10 can move a mandrel 60, described below, reciprocally through internal seals of the BOP 14. The reciprocal movement generates frictional heat. Therefore, the mandrel 60 and perhaps surrounding components can be cooled using a coolant flow path. Coolant can flow through a coolant system that is fluidically coupled to the first chamber 20 and the coolant tubes 40 and 72 therein. In at least one embodiment, the first chamber 20 is pressurized. The coolant is circulated therein for cooling the mandrel 60 and then exits the first chamber 20. In at least one embodiment, the coolant can be cooled and recirculated back to the first chamber and the coolant tubes. Specifically, in at least one embodiment, coolant in a coolant source 32, such as a reservoir, is provided to the coolant pump 34. The coolant pump 34 pressurizes the coolant and the coolant flows through a heat exchanger 36 for cooling the coolant. The coolant can flow through one or more lines to a BOP inlet 38 in the stub 18. The stub 18 can be fluidicly coupled to an inside volume of an inner coolant tube 40. The inner coolant tube 40 allows the coolant to flow therethrough and exit through one or more openings, such as a coolant outlet 42 in the top of the inner coolant tube 40. An outer coolant tube 72 surrounds the outer periphery of the inner coolant tube 40 and receives the coolant from the outlet on the inner coolant tube 40. In at least one embodiment, the outer coolant tube 72 is slidably engaged over the outer periphery of the inner coolant tube 40. The outer tube 72 can be coupled within the inner cavity of the mandrel 60. The mandrel in turn can be coupled to the actuator 10. As the actuator 10 reciprocates the mandrel 60, the outer coolant tube 72 moves with the mandrel 60 and the outer tube 72 slides up and down over the inner coolant tube 40. The outer coolant tube 72 includes one or more coolant openings disposed in at least the top half of the outer coolant tube to allow the coolant to flow to the top half of the inner cavity of the mandrel to cool the mandrel independent of a position of the mandrel relative to the inner coolant tube during a stroke of the mandrel.

After the coolant flows to the surfaces of the inner cavity of the mandrel, the coolant exits an annulus between the surface of the inner cavity and the outer surface of the outer coolant tube 72 and flows into the first chamber 20. The coolant is pressurized in the chamber 20 by the inflow of the coolant from the outer coolant tube 72 and can exit the first chamber 20 through a BOP coolant discharge 26. The pressure in the chamber 20 can be controlled by a pressure control valve 30 that, in at least one embodiment, can be coupled to the BOP coolant discharge 26. The coolant can flow through the pressure control valve 30 back into the coolant source 32 and/or to the pump 34 and then through the heat exchanger 36 with circulation back to the first chamber 20 and the inner coolant tube 40 therein.

Figure 3:
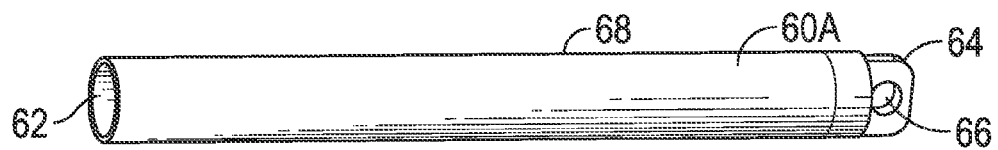
FIG. 3 is a schematic of an exemplary hollow mandrel having a uniform outside surface.

FIG. 3 is a schematic of an exemplary hollow mandrel having a uniform outside surface. The mandrel 60A has a substantially uniform outer surface 68. Such a surface could represent an outer surface of a conduit or tubing component used in a drill string that is inserted through a BOP in drilling and other operations in the field. The mandrel 60A can also include an inner cavity 62 that forms a hollow portion in the internal volume of the mandrel. The inner cavity can be used to insert the outer coolant tube described herein. The mandrel 60A further includes a coupler 64 that, in the exemplary embodiment, may also include a coupler opening 66. The coupler 64 can be used to couple the mandrel 60A with the actuator 10.

Figure 4:
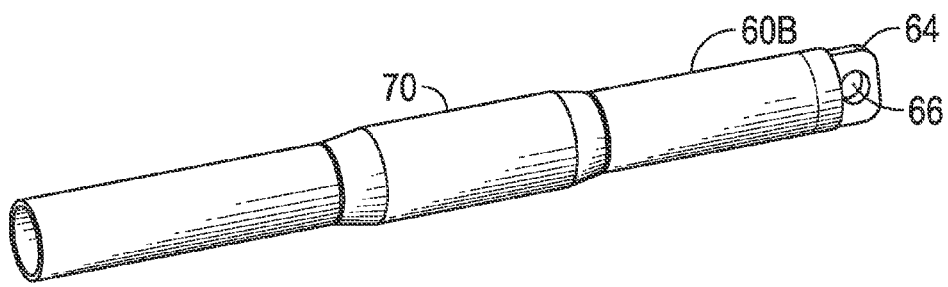
FIG. 4 is a schematic of an exemplary hollow mandrel having a non-uniform outside surface.

FIG. 4 is a schematic of an exemplary hollow mandrel having a non-uniform outside surface. Another exemplary mandrel 60B includes a non-uniform outer surface 70 having an expanded portion which may include one or more tapers. The expanded portion can simulate tool joints and other enlarged portions of a typical drill string that would pass through a BOP in the field. In a similar fashion, the mandrel 60B can include a coupler 64 with a coupler opening 66. These and other embodiments of mandrels will be generally referred to as mandrel 60.

Figure 5:
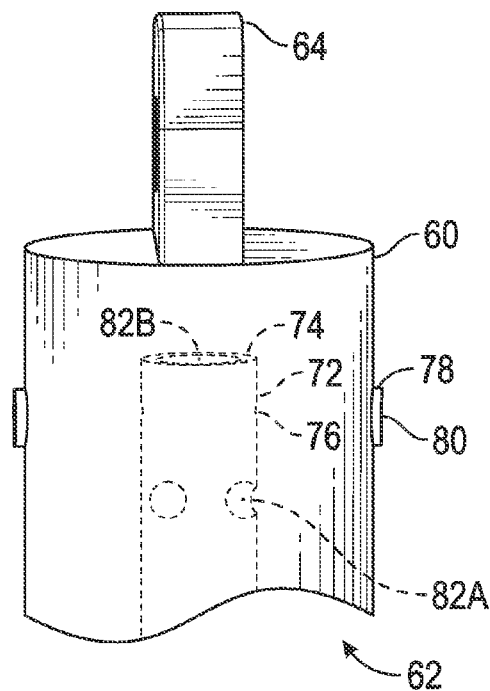
FIG. 5 is a schematic of an upper portion of the mandrels of FIGS. 3 and 4 with an internally mounted outer coolant tube in the upper portion of the mandrel.

FIG. 5 is a schematic of an upper portion of the mandrels of FIGS. 3 and 4 with an internally mounted outer coolant tube in the upper portion of the mandrel. The mandrel 60 with a coupler 64 is coupled with the outer coolant tube 72. In at least one embodiment, the coupling can occur by the outer coolant tube 72 being inserted into the inner cavity 62. A pin opening 76 in the outer coolant tube 72 can be aligned with a pin opening 78 in the mandrel and a pin 80 can be inserted through the pin openings 78 and 80 to couple the mandrel with the outer coolant tube. Thus, the outer coolant tube 72 is longitudinal fixably coupled with the mandrel 60. Other forms of coupling can occur, including rotationally. The outer coolant tube 72 generally will include one or more coolant openings 82 in the outer coolant tube to allow coolant that is received from the inner coolant tube to exit the outer coolant tube and flow to the surfaces of the inner cavity 62 of the mandrel 60. In at least one embodiment, the coolant openings 82 can include one or more coolant openings 82A in a sidewall of the coolant tube 72 and may be spaced around the periphery of the coolant tube. Further, one or more coolant openings 82B can be formed at the end 74 of the outer coolant tube 72, in addition to, or in lieu of the coolant openings 82A.

Figure 6:
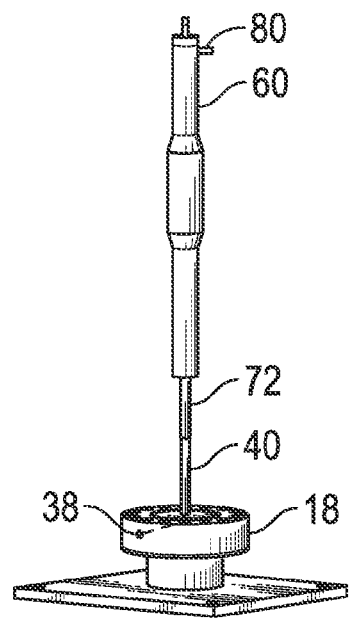
FIG. 6 is a schematic of the base, inner coolant tube, outer coolant tube, and mandrel attached with the outer coolant tube.

FIG. 6 is a schematic of the base, inner coolant tube, outer coolant tube, and mandrel attached with the outer coolant tube. The assembly inside the first chamber 20, shown in FIG. 2A, generally includes the components shown in FIG. 6. As described above, the stub 18 can include a BOP coolant inlet 38 that is fluidically coupled to the inner coolant tube 40. The outer coolant tube 72 can be slidably engaged with the inner coolant tube 40. The outer coolant tube 72 can be longitudinally coupled with the mandrel 60, such as by using a pin 80 or other coupling device.

Figure 7:
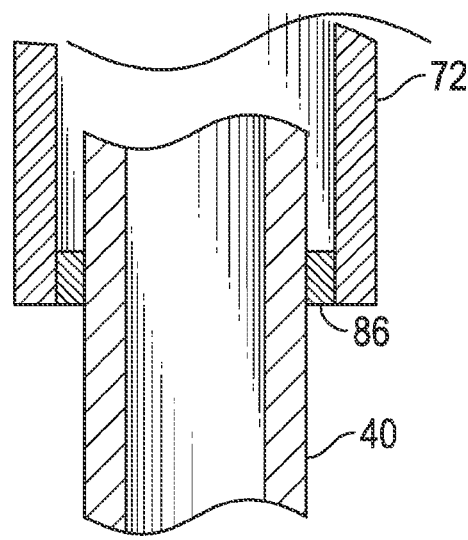
FIG. 7 is a schematic detail portion of an interaction between the inner coolant tube slidably engaged with the outer coolant tube with an optional seal therebetween.

FIG. 7 is a schematic detail portion of an interaction between the inner coolant tube slidably engaged with the outer coolant tube with an optional seal therebetween. The outer coolant tube 72 can be slidably engaged with the inner coolant tube 40, as described above. To facilitate coolant flow through the sliding engagement, a sliding seal 86 can be disposed in an annulus between the outer coolant tube 72 and the inner coolant tube 40. Thus, as the outer coolant tube 72 slides along the outer surface of the inner coolant tube 40, the seal 86 can reduce leakage along the sliding engagement.

Figure 8:
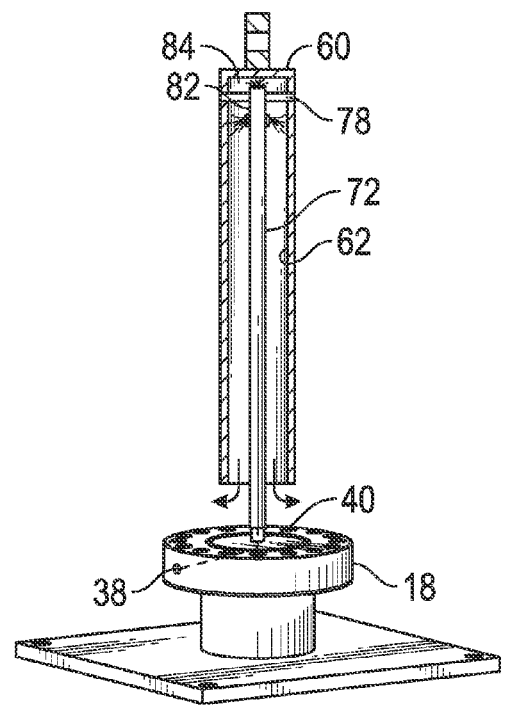
FIG. 8 is a schematic of the base, inner coolant tube, outer coolant tube, and mandrel attached with the outer coolant tube at a lower portion of a stroke of the mandrel.

FIG. 8 is a schematic of the base, inner coolant tube, outer coolant tube, and mandrel attached with the outer coolant tube at a lower portion of a stroke of the mandrel. When the actuator 10 lowers the mandrel 60 through the BOP 14, described in FIGS. 2A and 2B, the outer coolant tube 72 that is coupled with the mandrel 60 can be lowered to a low point of the stroke over the inner coolant tube 40. The coolant that flows through the BOP coolant inlet 38 can flow through the stub 18 and up through the inner coolant tube 40. The coolant flowing through the inner coolant tube 40 can flow into the outer coolant tube 72 and exit the coolant openings 82 in the outer coolant tube 72 and flow onto the surfaces of the inner cavity 62 on the mandrel 60. The coolant can flow downward and exit the annulus between inner cavity 62 and the outer coolant tube 72 and flow into the chamber 20 described in FIGS. 2A and 2B.

Figure 9:
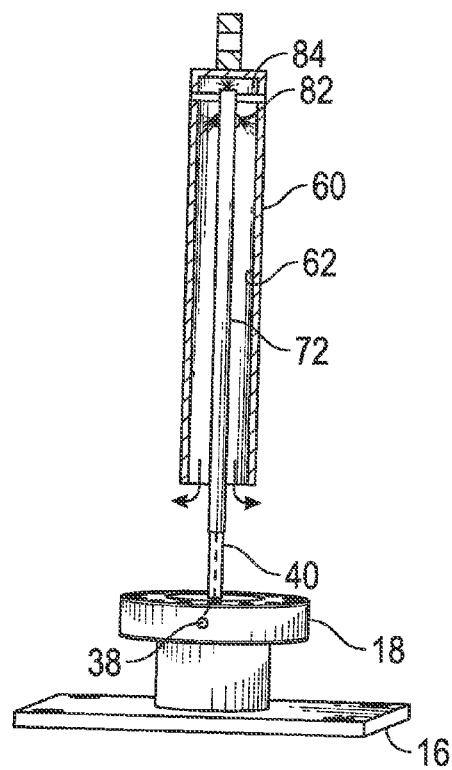
FIG. 9 is a schematic of the base, inner coolant tube, outer coolant tube, and mandrel attached with the outer coolant tube at an intermediate portion of the mandrel stroke.

FIG. 9 is a schematic of the base, inner coolant tube, outer coolant tube, and mandrel attached with the outer coolant tube at an intermediate portion of the mandrel stroke. As the mandrel 60 is lifted by the actuator 10 to an intermediate position of the stroke, the outer coolant tube 72 is lifted with the mandrel 60. Because the inner coolant tube 40 is fixably attached to the stub 18 of the test stand 16, the distance between the top of the outer coolant tube 72 and the bottom of the inner coolant tube 40 increases. However, the relative position between the mandrel 60 and the outer coolant tube 72 does not change. The coolant flow exiting the outer coolant tube remains in a similar position that is in at least a top half of the inner cavity 62 of the mandrel 60, and is independent of the position of the mandrel relative to the inner coolant tube during the stroke of the mandrel.

Figure 10:
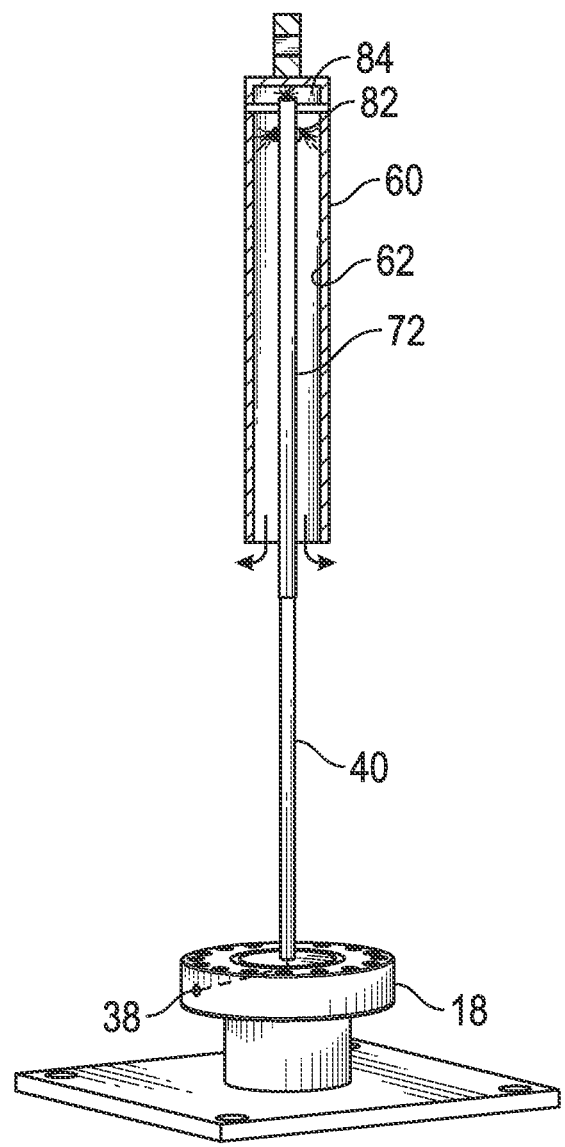
FIG. 10 is a schematic of the base, inner coolant tube, outer coolant tube, and mandrel attached with the outer coolant tube at an upper portion of the mandrel stroke.

FIG. 10 is a schematic of the base, inner coolant tube, outer coolant tube, and mandrel attached with the outer coolant tube at an upper portion of the mandrel stroke. As the actuator 10 raises the mandrel 60 to a top portion of the mandrel stroke, the outer coolant tube 72 is fully raised with the mandrel 60 independent of the inner coolant tube 40. The outer coolant tube 72 is still fluidicly coupled with the inner coolant tube 40, but the outer coolant tube has not changed its longitudinal position with the mandrel 60. Thus, coolant through the inner coolant tube 40 going into the outer coolant tube 72 and out of the coolant opening 82 can still flow onto the surfaces of the mandrel inner cavity 62 in a top half portion of the mandrel inner cavity 62, and then flow out of the annulus between the inner cavity 62 and the outer coolant tube 72. Thus, at the different positions of the mandrel during the mandrel stroke, the mandrel can be cooled with coolant flowing out to at least a top half of the mandrel inner cavity and generally downward along the remaining surfaces of the inner cavity as the coolant flows along the annulus between the inner cavity 62 and the outer coolant tube 72. Advantageously, the coolant can exit a top portion of the outer coolant tube 72 toward a topmost portion of the inner cavity 62 to help maximize cooling on the inner surfaces of the mandrel inner cavity. The coolant exiting the annulus of the inner cavity 62 and outer coolant tube 72 can flow into the chamber 20 and then out of the chamber 20 to be cooled and recirculated as described above.

Other and further embodiments utilizing one or more aspects of the invention described above can be devised without departing from the spirit of Applicant's invention. For example, other types of mandrels, actuators, pumps, reservoirs, coolant tubes, and test stands can be used, as well as other variations can occur in keeping within the scope of the claims.

Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the word "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unity fashion. The coupling may occur in any direction, including rotationally.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope or range of equivalents of the following claims.

What is claimed is:

1. A blowout preventer ("BOP") test system, comprising:
an actuator fluid source;
an actuator fluid pump fluidicly coupled to the actuator fluid source;
an actuator valve fluidicly coupled to the actuator fluid pump;
an actuator fluidicly coupled to the actuator valve;
a test stand having first chamber and coupled to the actuator;
an inner coolant tube coupled to the test stand and disposed at least partially in the first chamber;
an outer coolant tube slidably coupled with the inner coolant tube and having one or more coolant openings in a portion of a top half of the outer coolant tube;
a mandrel coupled to the actuator and configured to at least partially pass through the BOP, the mandrel having an inner cavity configured to allow the outer coolant tube to be disposed therein with the outer coolant tube coupled to the mandrel and the coolant openings of the outer coolant tube being configured to deliver coolant to a portion of a top half of the inner cavity of the mandrel independent of a position of the mandrel relative to the inner coolant tube during a stroke of the mandrel;
a BOP coolant outlet fluidicly coupled with the first chamber;
a pressure control valve fluidicly coupled to the BOP coolant outlet;
a coolant source fluidicly coupled to the pressure control valve;
a coolant pump fluidicly coupled to the coolant source;
a heat exchanger fluidicly coupled to the coolant pump; and
a BOP coolant inlet fluidicly coupled to the heat exchanger and to the inner coolant tube.

2. The system of claim 1, wherein combination of the inner coolant tube, the outer coolant tube, and the coupling of the outer coolant tube with the mandrel is configured to deliver fluid to the top half portion of the mandrel inner cavity during more than one-half of a stroke of the mandrel in the BOP.

3. The system of claim 1, further comprising the outer coolant tube having an outlet at the top of the outer coolant tube.

4. The system of claim 1, wherein the outer coolant tube is removably coupled with the mandrel.

5. The system of claim 1, further comprising a seal disposed between an outside periphery of the inner coolant tube and an inside periphery of the outer coolant tube.

6. The system of claim 1, further comprising a BOP mounted on the test stand and configured to allow the mandrel to reciprocally pass therethrough.

7. A method of testing a blowout preventer with a test system, comprising a blowout preventer ("BOP") test system, the test system comprising: an actuator fluid source; an actuator fluid pump fluidicly coupled to the actuator fluid source; an actuator valve fluidicly coupled to the actuator fluid pump; an actuator fluidicly coupled to the actuator valve; a test stand having first chamber and coupled to the actuator; an inner coolant tube coupled to the test stand and disposed at least partially in the first chamber; an outer coolant tube slidably coupled with the inner coolant tube and having coolant openings in a portion of a top half of the outer coolant tube; a mandrel coupled to the actuator and configured to at least partially pass through the BOP, the mandrel having an inner cavity configured to allow the outer coolant tube to be disposed therein with the outer coolant tube coupled to the mandrel and the coolant openings of the outer coolant tube being configured to deliver coolant to a portion of a top half of the inner cavity of the mandrel; a BOP coolant outlet fluidicly coupled with the first chamber; a pressure control valve fluidicly coupled to the BOP coolant outlet; a coolant source fluidicly coupled to the pressure control valve; a coolant pump fluidicly coupled to the coolant source; a heat exchanger fluidicly coupled to the coolant pump; and a BOP coolant inlet fluidicly coupled to the heat exchanger and to the inner coolant tube, the method comprising:

flowing actuator fluid from the actuator fluid source to the actuator fluid pump;

pumping the actuator fluid to the actuator valve;

controlling the actuator fluid flow through the actuator valve to the actuator;

reciprocally moving the mandrel by the actuator through a BOP mounted on the test stand;

generating heat from the reciprocal movement of the mandrel through the BOP;

flowing coolant from the coolant source to the coolant pump, through the heat exchanger, through the BOP coolant inlet, through the inner coolant tube, through the outer coolant tube, and out of the coolant openings in the outer coolant tube to inner surfaces of the top half of the mandrel inner cavity independent of a position of the mandrel relative to the inner coolant tube during a stroke of the mandrel.

8. The method of claim 7, further comprising flowing the coolant from the inner surface of the top half of the mandrel inner cavity to a pressure control valve.

9. The method of claim 8, further comprising flowing the coolant through the heat exchanger and flowing the coolant to the first chamber having the inner coolant tube.

\* \* \* \* \*